W. C. & W. H. TROUT.
SODA TANK FOR DIPPING LUMBER.
APPLICATION FILED SEPT. 20, 1909.

1,011,280.

Patented Dec. 12, 1911.
2 SHEETS—SHEET 1.

Witnesses
W. D. Schienbein
M. C. Blackburn

Inventors
Walter Charles Trout
William Henry Trout

By George Wetmore Colles
Attorney

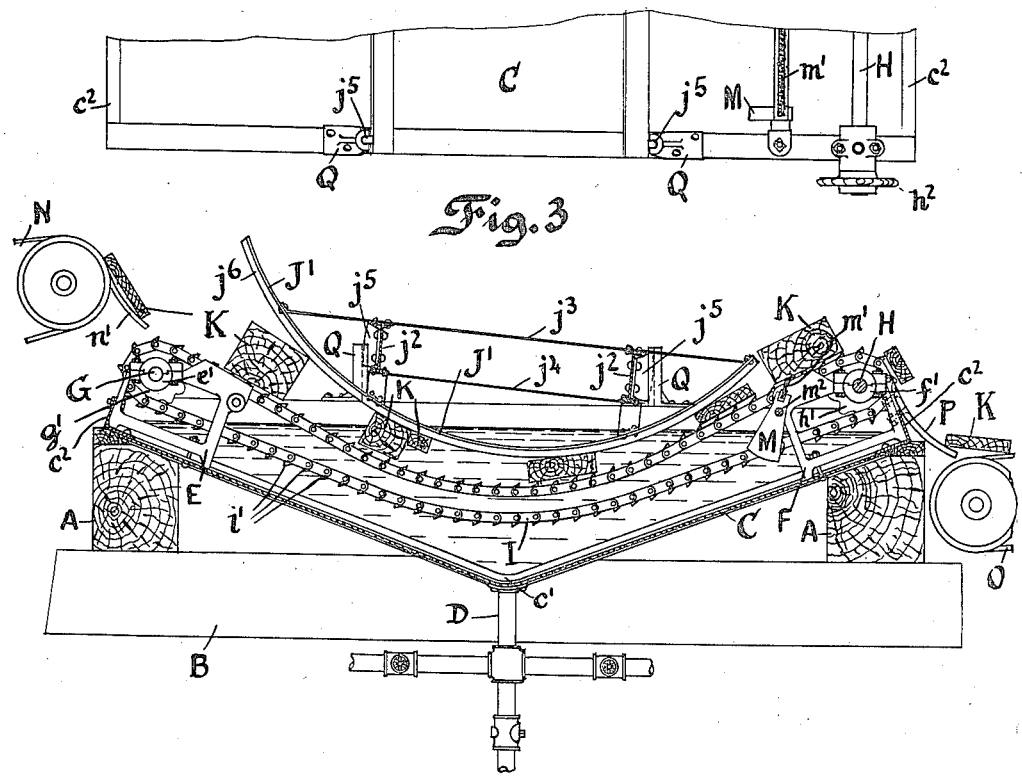

UNITED STATES PATENT OFFICE.

WALTER CHARLES TROUT, OF LUFKIN, TEXAS, AND WILLIAM HENRY TROUT, OF MILWAUKEE, WISCONSIN, ASSIGNORS TO SAID WALTER CHARLES TROUT AND LUFKIN FOUNDRY AND MACHINE COMPANY, A CORPORATION OF TEXAS.

SODA-TANK FOR DIPPING LUMBER.

1,011,280.  Specification of Letters Patent.  Patented Dec. 12, 1911.

Application filed September 20, 1909. Serial No. 518,561.

*To all whom it may concern:*

Be it known that we, WALTER CHARLES TROUT and WILLIAM HENRY TROUT, of Lufkin, Texas, and Milwaukee, Wisconsin, respectively, have invented a Soda-Tank for Dipping Lumber, of which the following is a specification.

Yellow pine lumber in its natural state is subject to what is known as "blue stain" under certain conditions, and to prevent this it is customary to immerse the green lumber in a solution of bicarbonate of soda. The means for doing this, as heretofore carried out, have comprised an elongated tank, into which the lumber is dipped and floated toward inclined chains which carry the lumber out of the tank. Such an apparatus, however, has the advantage that the solution becomes splashed over the operatives, platform, and surrounding objects, and requires one or more men to keep the lumber from floating crosswise and holding it in proper position to be taken up by the chains.

The object of our invention is to provide an improved apparatus which will not simply float the lumber, but thoroughly immerse it, dispense with all manual assistance whatever, and keep the lumber in perfect alinement at all times.

Furthermore we aim to produce an apparatus which will take all sizes of lumber, and which will not spill or splash the solution.

To these ends our invention comprises, in general, a tank having conveying chains and guides positioned above the lumber and acting to depress the lumber into the solution and hold it there until it passes out at the other side of the tank. We also provide means for removing superfluous liquid which would otherwise be carried out with the lumber by capilarity and dropped upon the conveying apparatus and floor beyond the limits of the tank.

Our invention further comprises the particular constructions and combinations which will be hereinafter more particularly described and set forth in our claims.

Figure 1:
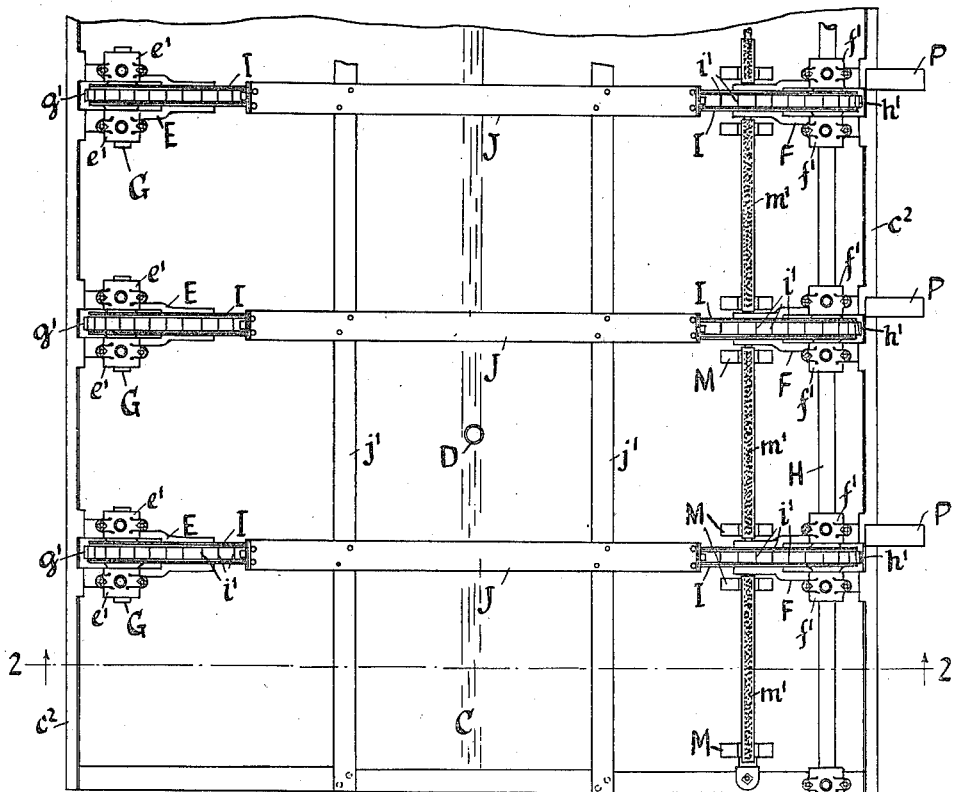
Figure 2:
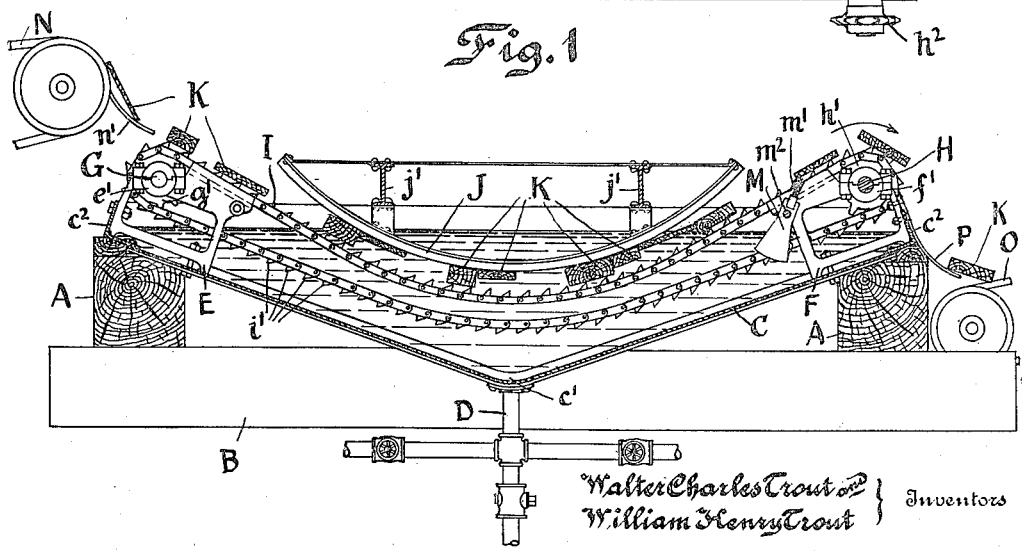

In the drawings accompanying this specification, Figure 1 is a plan view of part of a tank constructed according to our invention; Fig. 2 is a transverse section therethrough taken on the plane 2; Fig. 3 is a plan view of the end-portion of a more improved form of tank; and Fig. 4 is a transverse section therethrough.

In these drawings the same part is designated by the same reference letters or numerals in each figure.

Referring first to the simple form shown in Sheet 1 of the drawings, upon a suitable framework of longitudinal and transverse beams A, B is mounted a tank C, preferably of sheet metal, the two sides preferably dipping toward a vertex $c'$ to which a filling-space and drain-pipe system D is attached, arranged in any suitable manner. The edges of the tank are provided with upright or inturned flanges $c^2$ to prevent spilling of the liquid. Along the sides at suitable intervals within the flanges $c^2$, are mounted a series of pedestals E, F which carry bearing-boxes $e'$ $f'$ in which turn respectively a plurality of short shafts G and a single driving-shaft H. On each of the shafts G is mounted a sprocket-wheel $g'$, and on the shaft H are mounted a correspondingly disposed set of sprocket-wheels $h'$; and carrying-chains I are mounted to turn on these sprockets, said chains being sufficiently slack to allow both laps to dip into the solution in the tank, as shown.

Longitudinally across the center of the tank are mounted a pair of beams $j'$, which support curved lumber-guides J, disposed preferably one over each chain and dipping into the solution in the tank. The guides J are preferably made of flexible steel bands. The links of the chains I are provided with teeth or similar projections $i^2$, which seize upon the lumber K as it is dropped upon the chains and propel it forward, carrying it under the guides J and therefore immerse it in and carry it through the solution in the tank and raise it at the other side out of the solution. Before leaving the tank the superfluous liquid is removed by a plurality of wipers M which are in the form of palmetto brushes $m'$ pivotally mounted on shafts $m^2$ carried by the pedestals F and the lower end of which is weighted so as to hold the brushes pressed against the planks as they pass along over it.

The apparatus will ordinarily be arranged in connection with conveying belts N, which deliver the lumber over guides $n'$ to the chains I on the infeed side of the tank, and in connection with delivery belts O upon which the lumber is dropped from the chains as it falls off the delivery-end of the latter upon guides P. The driving-shaft H may be turned by means of a sprocket-wheel $h^2$ on one end, or any other suitable means.

The length of the tank and the number of chains will, of course, depend upon the length of the planks and other lumber to be treated. It will be observed that all of the moving apparatus is located within or immediately over the tank, and therefore none of the drippings from the solution can fall outside. The slacking of the chain allows different thicknesses of lumber to be carried through without trouble, as each plank as soon as it strikes the solution tends to float and is therefore turned to a horizontal position in which the edge can be caught by the teeth $i'$.

In the more elaborate form of the tank which we have shown in Sheet 2 of the drawings, the construction is similar to that already described, and hence the same parts are designated with the same reference-numerals, except for the guides and their mountings which are differently arranged. In this form of our invention we make the guides vertically movable so as to adapt the machine to handle any of the different sizes of sawed lumber. On each end of the tank are mounted a pair of grooved standards Q, and the guides J are independently mounted upon a framework consisting of longitudinal beams $j^2$ and transverse bars $j^3$, $j^4$. At each corner of the frame is secured a fin or flange $j^5$, which runs in the groove of the corresponding standard Q, the edges of said fins being convexly curved so that the frame as a whole may rise on either side independently of the other side. On the infeed side the guides J are formed with an extension $j^6$ which prevents their ends from getting caught against the edge of a piece of lumber in case it should be tilted in the reverse direction from that of the drawing. It will be seen that, in this arrangement, the sticks of lumber are always held down against the chain, and whenever an extra heavy piece is fed in, the guides rise to accommodate it, first at one side and then at the other, so that no strain is put upon the chains, and furthermore the lumber is always held in contact with the latter.

While we have hereinabove shown the most improved form of our invention, we wish it understood that not all of the features are essential thereto or necessarily made in the exact form shown, but various changes and modifications in the constructions as herein shown may be made without departing from the spirit of our invention, and we wish it understood therefore that the latter is not otherwise limited than by the reasonable scope of our claims.

Having thus described our invention, what we claim as new and desire to secure by Letters Patent is—

1. In a dipping-tank for lumber, in combination with a conveying-device adapted to carry lumber out of said tank, means for removing the superfluous liquid from the lumber after it leaves the solution and before it passes out of the tank; said means comprising a brush disposed below the path of said lumber and in position for wiping the lower side thereof.

2. In a dipping-tank for lumber, in combination with a conveying-device adapted to carry lumber out of said tank, means for removing the superfluous liquid from the lumber after it leaves the solution and before it passes out of the tank; said means comprising a pivotally mounted brush disposed below the path of the lumber, said brush pointing upward in position to wipe the lower face of the lumber as it passes from the brush and being weighted so as to maintain said brush yieldingly in position.

3. An apparatus of the class described comprising a flattened tank adapted to hold a chemical solution, a plurality of journal-bearings mounted on each side of and directly over said tank, a driving-shaft turning in the bearings set on one side of said tank, a plurality of sprocket-wheels turning on said shaft, a second set of sprocket-wheels turning in a shaft in the bearings on the other side of the tank, conveying-chains disposed transversely across said tank and each carried on a sprocket-wheel on each side, said chains being sufficiently slack so that both laps thereof dip into the solution therein, and a wiper comprising a brush disposed below the path of the lumber at the delivery side of the tank and at a point above the level of the solution, said brush being directed upward in a position to wipe the lower face of the lumber as it passes over said brush.

4. An apparatus of the class described comprising a tank of flattened V-shaped section adapted to hold a solution, a pipe disposed at the apical angle of said tank for filling and draining the same, upright flanges at the edges of said tank adapted to retain the liquid therein, a plurality of pedestals disposed within said flanges at each side of said tank, the pedestals at one side being opposite those of the other, sprocket-wheels carried by the several pedestals, means for driving the sprocket-wheels on one side, slack conveying-chains extending across the tank and mounted on sprocket-wheels on opposite sides, the ends of the chains being above the solution and the middle portion of each lap depending into the solution, a plurality of curved guides disposed transversely over said tank midway between the sides thereof and dipping into the solution therein, said guides coacting with said chains to hold the lumber in contact therewith whereby said chains carry it below said guides and cause it to be immersed in the solution as it passes from one side of the tank to the other, and one or more yieldingly mounted wiperbrushes disposed at the side of said tank between the chains and above the level of the liquid, said brushes being adapted to wipe the lower face of the lumber as it is carried out of said tank by said chains.

5. The combination of a dipping-tank, a carrier disposed below the surface of the solution having continuous motion in one direction, and one or more guides working above said tank and adapted to depress the lumber which passes under it and hold it in contact with said carrier, said guide or guides having a rising and falling movement and being free to rise and fall during operation.

6. The combination of a dipping-tank, a carrier disposed below the surface of the solution having continuous motion in one direction, and one or more guides working above said tank and adapted to depress the lumber which passes under it and hold it in contact with said carrier, said guide or guides having a rising and falling and also a tilting movement whereby they are caused to rest upon the lumber being treated independently of its size.

7. The combination with a dipping-tank for lumber, of an endless carrier disposed below the surface of the solution therein and having means for advancing pieces of lumber which are brought into contact therewith, and means for depressing the lumber into said solution and upon said carrier, said means comprising rising and falling guides which normally rest upon said lumber.

8. The combination with a dipping-tank for lumber of an endless carrier disposed below the surface of the solution therein and having means for advancing pieces of lumber which are brought into contact therewith, and one or more rising and falling guides mounted above said tank in position to depress the lumber and hold it against said carrier, a framework on which said guide or guides are mounted, and means for guiding said framework in its rising and falling movement.

9. The combination with a dipping-tank for lumber of an endless carrier, disposed below the surface of the solution therein and two pairs of vertical standards one pair of which is mounted on each end of said tank, a frame having a pair of fins at each end which are adapted to engage in grooves in said standards permitting the frame to rise and fall therein, and one or more guides for the lumber mounted on said frame and disposed parallel to the movement of said carrier.

10. In a device of the class described, a tank for liquid of flattened V-shape, open at the top adapting it for use with a conveyer, closed at the ends and having marginal flanges at right angles to the sloping sides of the bottom, whereby the liquid contained in the tank is prevented from spilling and waves striking thereagainst are reflected back into the tank combined with a conveyer mounted in said tank.

11. In a device of the class described, a tank for liquid open at the top to adapt it for use with a conveyer, said tank being formed of a metal sheet bent at the center to form a diedral angle, said sheet forming a bottom of flattened V-shape, side sheets closing the otherwise open ends of said bottom-sheet, and marginal flanges on the horizontal edges of said sheet substantially at right angles to the sheet combined with a conveyer mounted in said tank.

12. In a device of the class described, a tank for liquid open at the top to adapt it for use with a conveyer, said tank being formed of a metal sheet bent at the center to form a diedral angle, said sheet forming a bottom of flattened V-shape, side sheets closing the otherwise open ends of said bottom-sheet, and marginal flanges on the horizontal edges of said sheet substantially at right angles to the sheet, in conjunction with a drain and supply-pipe opening at the diedral angle of said sheet combined with a conveyer mounted in said tank.

13. A tank of flattened V-shaped crosssection open at the top for the full width of the tank to adapt it for use with a conveyer, said tank consisting of a metal sheet bent at the center to form a diedral angle and two angle-bars each secured by one flange to the respective sloping edges whereby the other flange of each stands upwardly sloping inward and at a right angle to the sloping side combined with a conveyer mounted in said tank.

In witness whereof we have hereunto set our hands this third day of September, 1909 in the presence of two witnesses.

WALTER CHARLES TROUT.
    WILLIAM HENRY TROUT.

Witnesses for W. C. Trout:
    RACHEL GOLDSTONE,
    FRED. J. LUCK.

Witnesses for W. H. Trout:
    GEORGE WETMORE COLLES,
    FLORENCE REINHOLD.